United States Patent [19]

Galluccio

[11] 3,917,908

[45] Nov. 4, 1975

[54] CALL CONCENTRATOR WITH EXPANDED INTRACALL CAPABILITY

[75] Inventor: Vincent P. Galluccio, San Francisco, Calif.

[73] Assignee: Lynch Communication Systems, Inc., San Francisco, Calif.

[22] Filed: June 19, 1972

[21] Appl. No.: 263,945

[52] U.S. Cl. .......................... 179/18 FC; 179/18 AB

[51] Int. Cl.$^2$ .......................................... H04Q 3/60

[58] Field of Search .................... 179/18 FC, 18 AB

[56] References Cited

UNITED STATES PATENTS

| | | | |
|---|---|---|---|
| 3,047,665 | 7/1962 | Zarouni | 179/8 |
| 3,121,197 | 2/1964 | Irland | 325/30 |
| 3,217,109 | 11/1965 | Abert | 179/18 FC |
| 3,250,859 | 5/1966 | Fisher | 179/18 FC |
| 3,778,555 | 12/1973 | Nordling et al. | 179/18 FC |

*Primary Examiner*—Thomas W. Brown
*Attorney, Agent, or Firm*—Phillips, Moore, Weissenberger Lempio & Strabala

[57] ABSTRACT

A call concentrator is disclosed which makes maximum use of a limited number of trunks by establishing intracalls through direct AC connections between trunk terminals. The two trunks that would have been used to handle this intracall are now available for intercall use. The concentrator uses a sophisticated FSK data link system to prevent false connections or disconnections. It permits remote-end verification of intracalls and reorder signal injection when all trunks are busy. Special traffic count facilities are included to permit easy analysis of the concentrator's utilization and to allow maximum subscriber concentration. The concentrator uses its own idle trunks to provide power to the remote unit so as to obviate the need for an external power source at the remote location.

13 Claims, 8 Drawing Figures

CALL CONCENTRATOR WITH EXPANDED INTRACALL CAPABILITY

REFERENCE TO RELATED APPLICATIONS

Other aspects of the call concentrator of this invention are disclosed in copending application Ser. Nos. 264,517, filed June 20, 1972, now U.S. Pat. No. 3,863,035, entitled Call Concentrator Switching Matrix (details of the switching units), and 264,513, filed June 20, 1972, now abandoned, entitled Call Concentrator Control System (operation of the control units).

BACKGROUND OF THE INVENTION

Call concentrators of various types are well known in the telephone art. Some of the prior art concentrators are capable of setting up intracalls within the remote unit of the concentrator, and then releasing one or both of the trunks over which the call was originally established. To establish the intracall at the remote unit, the prior art devices relied on a small number of intracall buses in the remote unit to which both the calling subscriber and the called subscriber could be connected.

The prior art systems of this type were unsatisfactory because the number of intracall buses was severely limited by the complexity of the switching equipment required by each bus; and consequently, prior art equipment of this type was generally unable to handle more than 2 or 3 intracalls simultaneously. In Addition, prior art systems did not release the switch train in the central office once an intracall had been established; and it was impossible to verify an intracall in the prior art devices once the trunks had been released. Also, there was no way of giving a reorder indication to an incoming call when a connection could not be established through the concentrator; and there was no simple way to analyze the concentrator traffic to determine whether the concentrator circuits were being used at their optimum design efficiency.

SUMMARY OF THE INVENTION

The concentrator of the invention provides more than double the intracall capacity, on the average, of prior art devices having the same number of subscribers and trunks; yet it achieves this capacity with substantially fewer switching devices such as relays, and at substantially lower cost. The inventive concentrator has no intracall buses. Instead, it establishes intracalls by connecting together the trunk connectors involved in the original connection, releasing the trunks, and connecting the released trunks to other trunk connectors for intercall use. In the specific embodiment shown, the interconnection between the trunk connectors is an AC talking path only, the trunk connectors being provided with individual talking batteries when an intracall is established.

By using this approach, the intracall capacity of a 21-trunk concentrator varies between 10 and 0, depending on the sequence in which the intercalls and intracalls are established. The statistical probabilities involved are such that the normal intracall capacity of the inventive concentrator is about 6.

The concentrator of this invention permits the central office switching train to drop out when an intracall connection has been completed. The lines of the parties to the intracall are busied by grounding the C-leads of the affected lines independently of the central office equipment, and allowing the central office equipment to interpret the release of the trunks as a disconnect by both parties.

The recognition of an intracall service request (usually involving the detection of a special tone on two trunks of the same concentrator) is a substantial source of problems in the prior art concentrators, particularly in central offices serving several call concentrators. The present invention overcomes these problems by using a special frequency-shift-keyed (FSK) recognition code together with a phase comparison feature, and by preventing the code from appearing on the line until the called subscriber answers.

The concentrator of this invention allows verification of an intracall after the trunks have been released by providing a special verification trunk connected to a scanner which detects the presence of the verification operator's circuit on a given line. The remote end of the verification trunk is then connected, with the aid of the memory in the control unit, to the intracall trunk connector used by the subscriber who is being verified.

In the prior art devices, a terminating call to an idle subscriber line triggered a ringing signal even though the call was blocked in the concentrator by a lack of available trunks, thereby causing a false DA (doesn't answer) indication. The present invention prevents false DA indications by responding to the ringing signal with an artificial, toll-free off-hook condition and a reorder signal if the concentrator fails to connect the called line to the subscriber.

The operating efficiency of the concentrator of this invention can be substantially impaired by the manner in which the subscriber lines are allocated between various types of subscribers generating various amounts of traffic. Checking the lines individually is so time-consuming as to be impractical. In accordance with the invention, the concentrator is therefore equipped to calculate, on the basis of continual sampling, and to display concurrent information on trunk usage, percentage of blocking, and number of calls blocked or number of intracalls connected. The relationship of these data is a direct indication of whether or not the concentrator is being operated at its optimum design efficiency. In addition, these data provide a ready indication of whether the concentrator is in danger of becoming chronically overloaded.

It is therefore the primary object of the invention to provide a call concentrator having a high average intracall capability and providing improved trunk utilization with relatively few switching devices.

It is another object of the invention to provide a call concentrator capable of releasing the central office switching train as well as both trunks when an intracall has been established.

It is a further object of the invention to provide a call concentrator capable of highly accurate intracall service request recognition.

It is still another object of the invention to provide a call concentrator permitting verification of an intracall after the parties to the intracall have been disconnected from the central office.

It is a still further object of the invention to provide a call concentrator in which a false DA indication on terminating calls is prevented by disconnecting the ringing signal without triggering the toll equipment and causing a reorder signal to be heard by the calling party, whenever the concentrator is unable to establish a connection between a subscriber line at the central office and the remote subscriber assigned to it.

It is yet a further object of the invention to provide a traffic monitoring system for a concentrator of the type described which provides a display permitting ready determination of whether or not the concentrator is being effectively utilized.

DESCRIPTION OF THE PREFERRED EMBODIMENT

1. General

Figure 1:
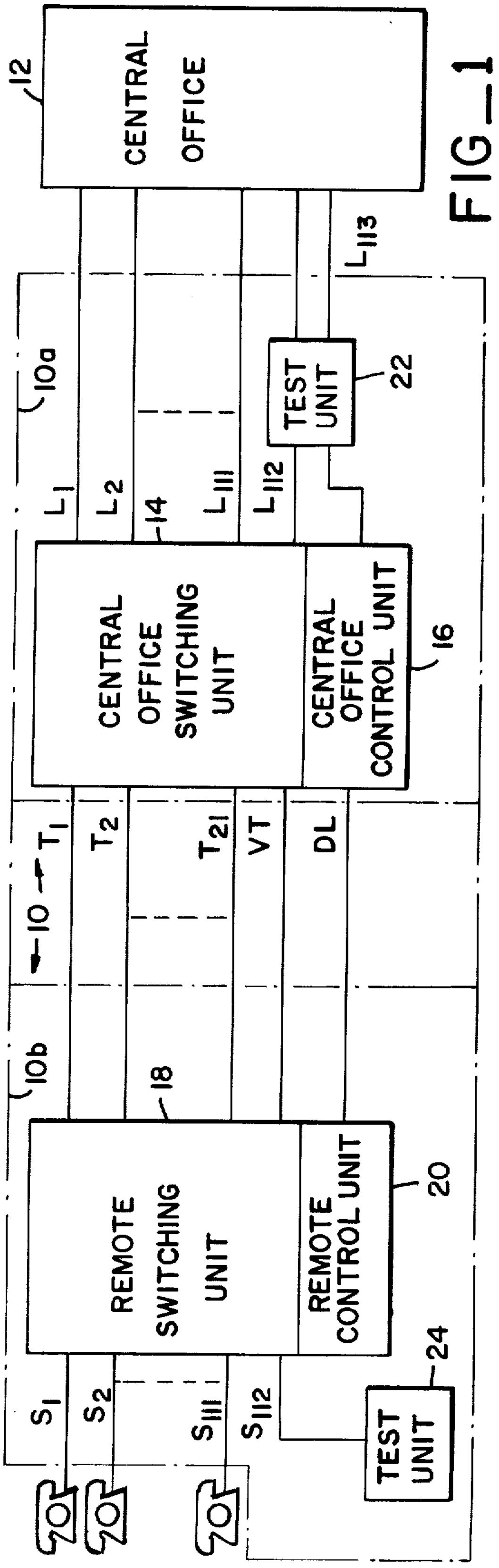
FIG. 1 is a block diagram showing the general environment of the invention.

The general environment of the invention is illustrated in FIG. 1, where the concentrator is shown at 10. The basic purpose of the concentrator 10 is to connect the line terminals L of a standard central office 12 to the subscriber lines S coming from the telephones of a group of subscribers located at a considerable distance from the central office 12, e.g., in a village miles away from the nearest town large enough to have a central office. In this situation, it is economically impractical to run a separate cable pair to each subscriber all the way from the central office, and a call concentrator is required to concentrate the traffic between the subscribers and the central office onto a relatively small number of trunks extending between the central office and the remote location.

Typically, no buildings or maintenance facilities are available at the remote location, and occasionally even commercial power is unavailable or unreliable. Consequently, the remote portion of the concentrator is physically no more than a cabinet in a weatherproof enclosure, containing a minimum of switching equipment, and operated wholly by remote control from the central office end.

The concentrator 10 consists of a central office portion 10a and a remote portion 10*b*. The former contains a central office switching unit 14 and a central office control unit 16, while the latter contains a remote switching unit 18 and a remote control unit 20. The control units 16, 20 are linked by a data link DL.

The switching units 14, 18 contain the circuitry for selectively interconnecting the central office lines L or the subscriber lines S, respectively, with the concentrator trunks T, and for performing the ancillary functions described and illustrated in this application. The basic circuitry for interconnecting the lines L or S with the trunks T. The circuitry of this invention is such that it requires no modification of the central office 12; i.e., as far as the central office 12 is concerned, it cannot tell whether its subscriber terminals L are connected to the subscribers' telephones directly or through the concentrator 10.

In the embodiment discribed hereinafter, the concentrator 10 concentrates 112 subscriber lines into 21 trunks T. Two additional trunks serve as a verification trunk VT and a data link DL. All control signals between the portions 10*a* and 10*b* are in the voice band, so that a repeatered PCM, frequency-multiplexed or microwave system may be used to interconnect the portions 10*a* and 10*b* of concentrator 10.

One of the 112 subscriber lines may be devoted to a test system including a pair of test units 22, 24 whose functioning is described in more detail hereinafter.

2. Intracall Detection

The concentrator of this invention provides intracall facilities to increase the traffic capacity of the concentrator. Although all calls are originally connected by the central office 12 over the trunks T, circuitry is provided to release the trunks when two subscribers at the remote location call each other, the connection being then made directly within the remote switching unit 18.

A standard procedure for detecting the presence of an intracall is to inject a special tone into the trunk used by a calling subscriber, and to scan the other trunks for the appearance of that tone. This procedure is unsatisfactory, however, particularly when more than one concentrator is used in the same central office, because of crosstalk and other misidentification problems.

Figure 2:
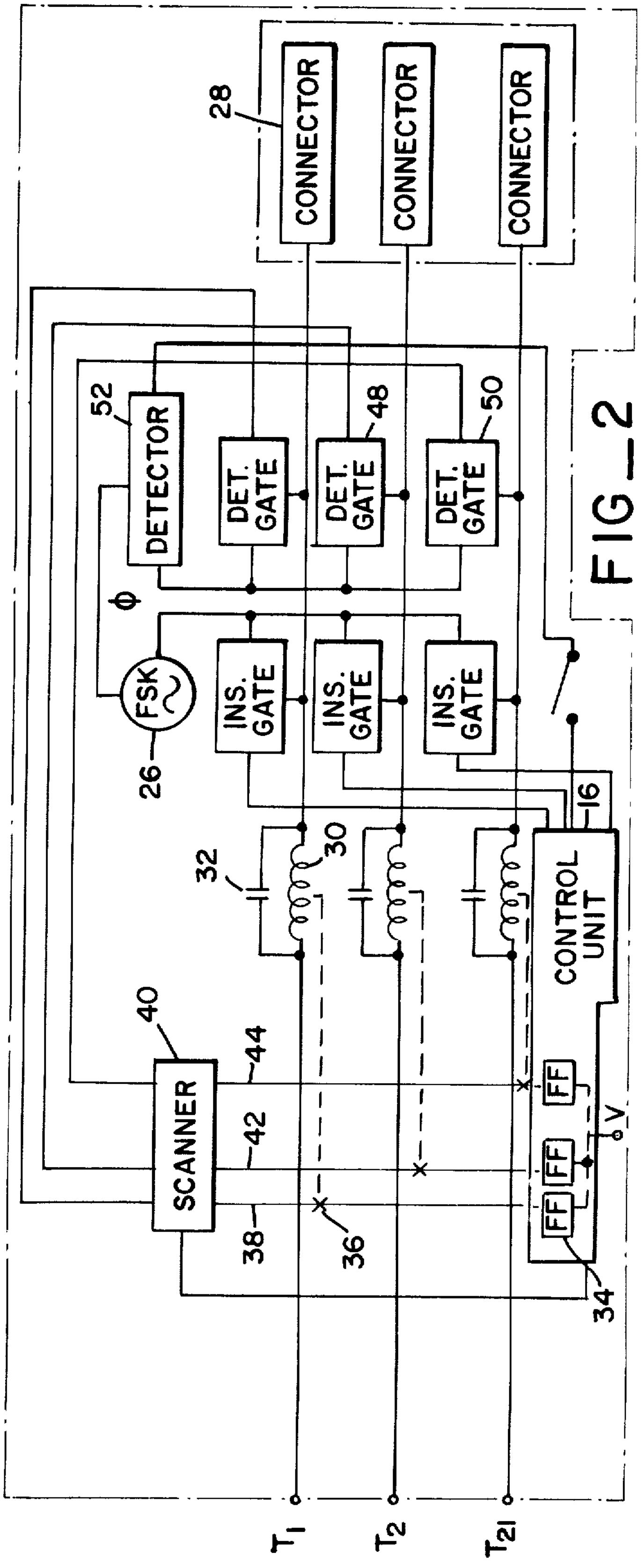
FIG. 2 is a fragmentary circuit diagram, partly in block form, showing the intracall service request recognition circuit of the invention.
Figure 3:
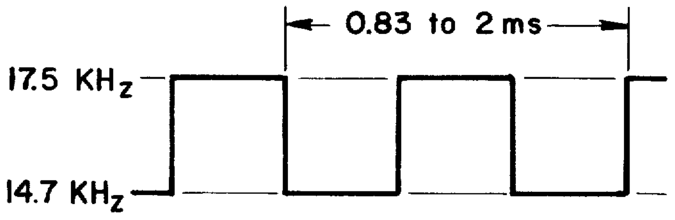
FIG. 3 is a time-frequency diagram showing the FSK recognition code used in conjunction with the circuit of FIG. 2.

In accordance with the invention, a frequency-shift-keyed (FSK) oscillator 26 is provided as shown in FIG. 2 to produce the FSK identification signal shown in FIG. 3. Whenever a trunk such as $T_1$ is connected to the central office through its trunk connector 28, and the called party has answered, direct current from the central office talking battery flows through trunk $T_1$ and hence through the reed relay coil 30. The relay coil 30 is AC-bypassed through a large capacitance 32 so as not to interfere with voice transmission over trunk $T_1$.

The central office control unit 16, upon selecting trunk $T_1$ to satisfy the service request of the calling subscriber, sets flip-flop 34 to a closed-circuit position for the circuit shown. As soon as the subscriber called by the user of trunk $T_1$ has answered, contact 36 of relay 30 closes, and scanner terminal 38 is energized.

Scanner 40 continuously scans its terminals 38, 42, 44. Whenever it senses a completed calling trunk seizure as at 38 by the setting of flip-flop 34 combined with the closing of relay contact 36, it transmits that information to the control unit, which thereupon opens the insertion gate 46 for a predetermined period of time, preferably about one second. As a result, the recognition signal of FIG. 3 is inserted on trunk $T_1$ by oscillator 26. The scanner 40 simultaneously starts opening the detection gates 48, 50 in sequence.

When the opening of a detection gate such as 50 results in the recognition signal of FIG. 3 being conveyed to detector 52 from trunk $T_{21}$, an intracall (i.e., a call both originating and terminating at the remote location) has been detected. Detector 52 thereupon checks the following characteristics of the signal on trunk 21: correct signal frequencies (17.5 kHz and 14.7 kHz); correct keying rate (0.5 to 1.2 kHz selectable for various concentrators at the same central office); and correct phase (substantially identical to that of FSK oscillator 26).

Different concentrators in the same central office would have the same signal frequencies but different keying rates; in addition, the signal frequencies are high enough to be attenuated to the point of total loss on any significant cable run; in other words, spurious transmission of the recognition signal from one central office to another is highly unlikely. Consequently, there is a remote possibility that the recognition signal might come from a concentrator at another central office with the same keying rate; but the chance of such a signal also having the same phase as the signal produced by oscillator 26 is essentially zero.

The high signal frequency also has the advantage of allowing faster detection, and in addition to being severely attenuated between the central office and the remote-location subscriber, it is also fairly inaudible to most adult humans by virtue of its extremely high pitch.

Detection of a valid recognition signal triggers the detector 52 to write into the control unit 16 the position of scanner 40, whereupon the control unit 16 executes the necessary steps to connect the calling subscriber with the called subscriber inside remote switching unit 18 (FIG. 1), and to release the trunks $T_1$ and $T_{21}$ for other calls. The detector 52 may be disabled by a switch 53 to permit servicing of the intracall equipment without disturbing the operation of the concentrator.

3. Intracall Connection

The primary object of this invention is to provide an intracall capability which will result in the least possible blocking (i.e., inability to complete a call) with a minimum of trunks and a minimum of switching equipment. Prior art intracall devices provided a number of intracall buses in the remote switching unit to which all or some of the subscriber lines could be directly connected. Thus, a 112-subscriber remote unit with three intracall buses required 336 relays (one for each crosspoint of a subscriber line and an intracall bus) and could carry three intracalls at any given time. Two of these relays had to be operated for each intracall.

The present invention departs from the concept of connecting intracalls between subscriber lines, and instead connects them between trunks. Furthermore, it does not use any intracall buses but connects the trunks directly together. Inasmuch as the 112-subscriber remote unit 18 of this invention uses 21 trunks, there are only 210 different ways to interconnect the trunks with each other; hence only 210 intracall relays are required.

For reasons explained hereinafter, the intracall capacity of this system at any given time varies between 0 and 10, depending upon the sequence in which intercalls and intracalls are originated. The laws of probability dictate, and tests have confirmed, that the inventive system is capable, on the average, of handling six intracalls simultaneously — roughly three times the intracall capacity per intracall relay of prior art systems.

Figure 4:
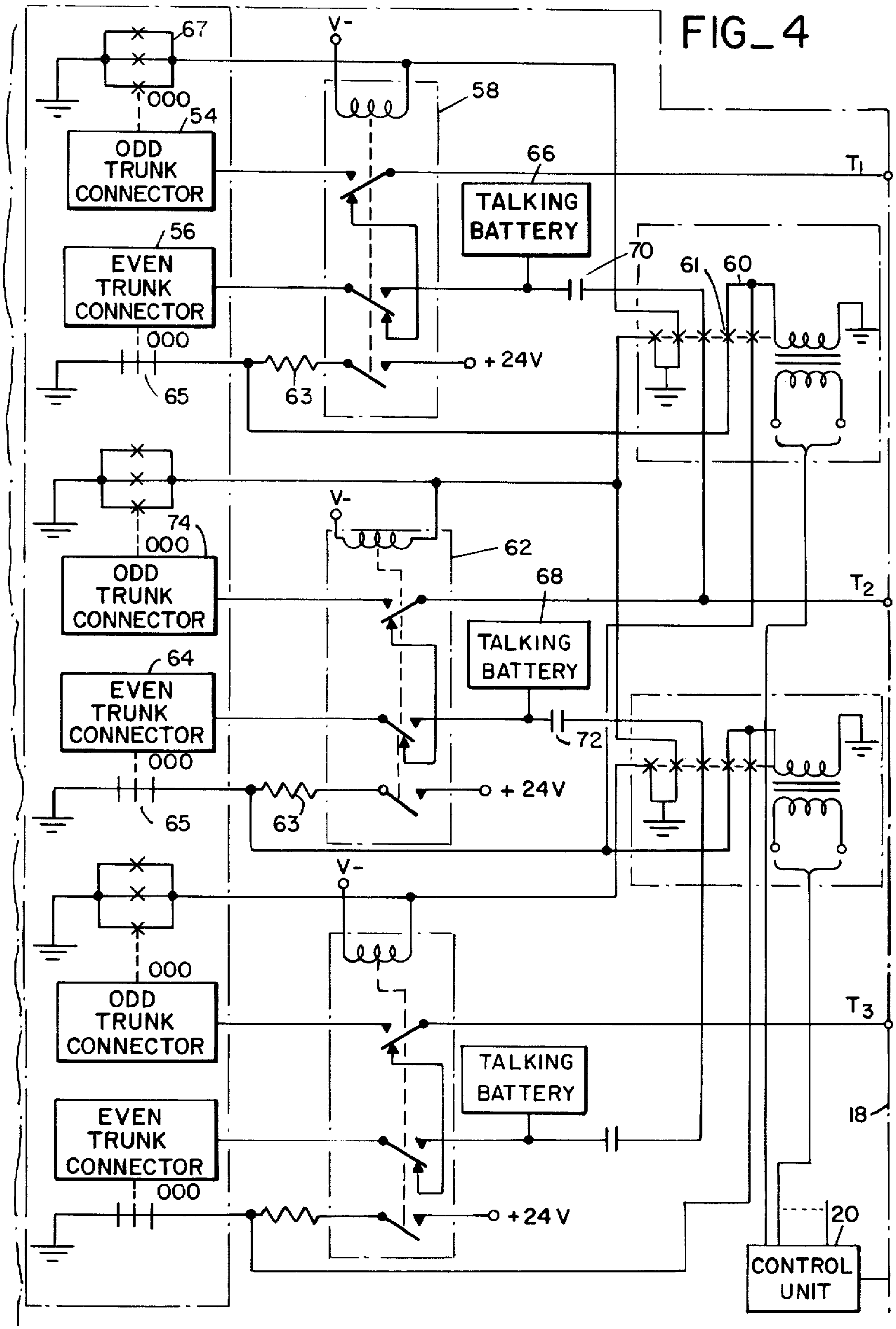
FIG. 4 is a fragmentary circuit diagram, partly in schematic form, showing the intracall connection circuitry of this invention.

FIG. 4 shows that when the intracall feature is added to a switching matrix using sets of relay trees, each trunk T is provided with two relay trees or connectors instead of one.

Each pair of connectors consists of an odd connector 54 and an even connector 56. Normally, trunk $T_1$ is connected through the upper and center contact arms of trunk-switching relay 58 (shown in released position in FIG. 4) to its even connector 56. When an intracall is to be connected between, say, trunks $T_1$ and $T_2$, the control unit 20 momentarily operates intracall relay 60 (one of the 210 intracall relays, of which two are shown in FIG. 4) to close its contacts. Relay 60 thereupon locks itself in through its own contacts 61, resistors 63, and the lower contacts of relays 58 and 62 while the connectors 54, 56 depart from their 000 position as they establish the intracall connection.

The two leftmost contacts of intracall relay 60 operate trunk-switching relays 58 and 62. This causes the even connector 56 (which is connected to, say, the calling subscriber) and the even connector 64 (which is connected to, say, the called subscriber) to be connected to their respective talking batteries 66 and 68. At the same time, the rightmost contact of intracall relay 60 establishes an AC talking path between the two subscribers through DC blocking capacitors 70 and 72.

Simultaneously with the establishment of the intracall connection through intracall relay 60, the upper contact arms of trunk-switching relays 58 and 62 release trunks $T_1$ and $T_2$ by connecting them to the odd connectors 54 and 74, respectively. In the odd position, trunks $T_1$ and $T_2$ are available to handle another call but can no longer be released if that call turns out to be an intracall.

If the intracall through intracall relay 60 ends while trunk $T_1$ is in use by another subscriber, the return of connectors 56 and 64 to the 000 position establishes ground paths through contacts 65 which deprive relay 60 of power and cause it to drop out. If trunk $T_1$, for example, is in use for an intercall at that time, the ground connection for the coil of relay 58 is maintained through the parallel contacts 67. Relay 58 is thus prevented from dropping out until the intercall on Trunk $T_1$ is disconnected.

The contrast between the concentrator of this invention and the prior art can be illustrated by the following example. If the first 10 calls are intracall requests, the inventive system can satisfy them all and still handle 21 intercalls. The corresponding prior art system, on the other hand, can satisfy only the first three intracall requests.

On the other hand, if the first 19 calls are intercalls, the prior art system can then still satisfy three intracall requests with the remaining two trunks, and leave the trunks free for two more intercalls thereafter. If the first 19 calls in the inventive system are intercalls, only one intracall request can be satisfied with the two remaining trunks before restricting those trunks to intercalls.

4. Central Office Release

Figure 5:
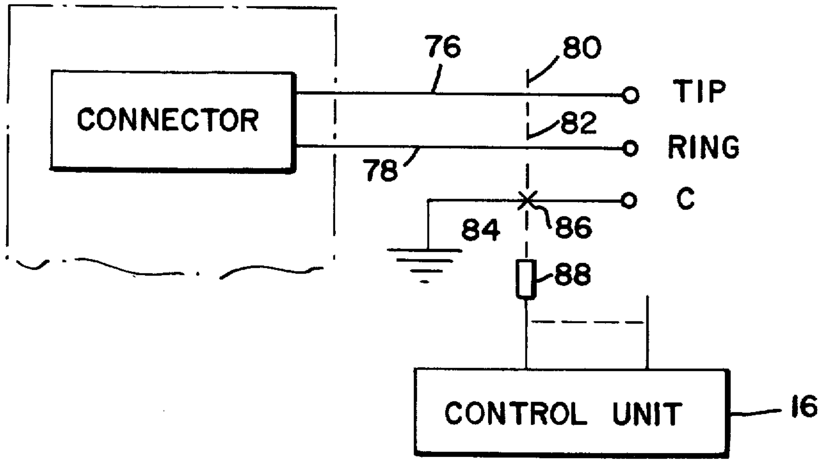
FIG. 5 is a fragmentary circuit diagram, partly in block form, showing the C-lead grounding feature of the invention.

FIG. 5 illustrates the manner in which the concentrator of this invention allows the release of the central office switch train when the trunks are released following the remote connection of an intracall.

Prior art systems maintained a resistive connection across the tip and ring leads of the affected subscribers after releasing the trunks on an intracall. This caused the central office switch train to maintain the original interconnection of the subscribers and to busy their lines to the outside world by grounding the subscribers' C-leads through the central office switch train.

The present invention overcomes this unnecessary tie-up of the central office switchgear by opening the subscriber's tip and ring leads 76, 78 at contacts 80, 82 and by grounding the subscriber's C-lead 84 through contact 86 of a relay 88 operated by control unit 16 concurrently with the release of the central office switchgear. In this manner, the central office 12 (FIG. 1) sees a disconnect and drops out the switch train which originally established the connection between the two remote-location subscribers. However, their lines remain busied against any terminating calls by the grounding of their C-leads.

5. Intracall Verification

Figure 6:
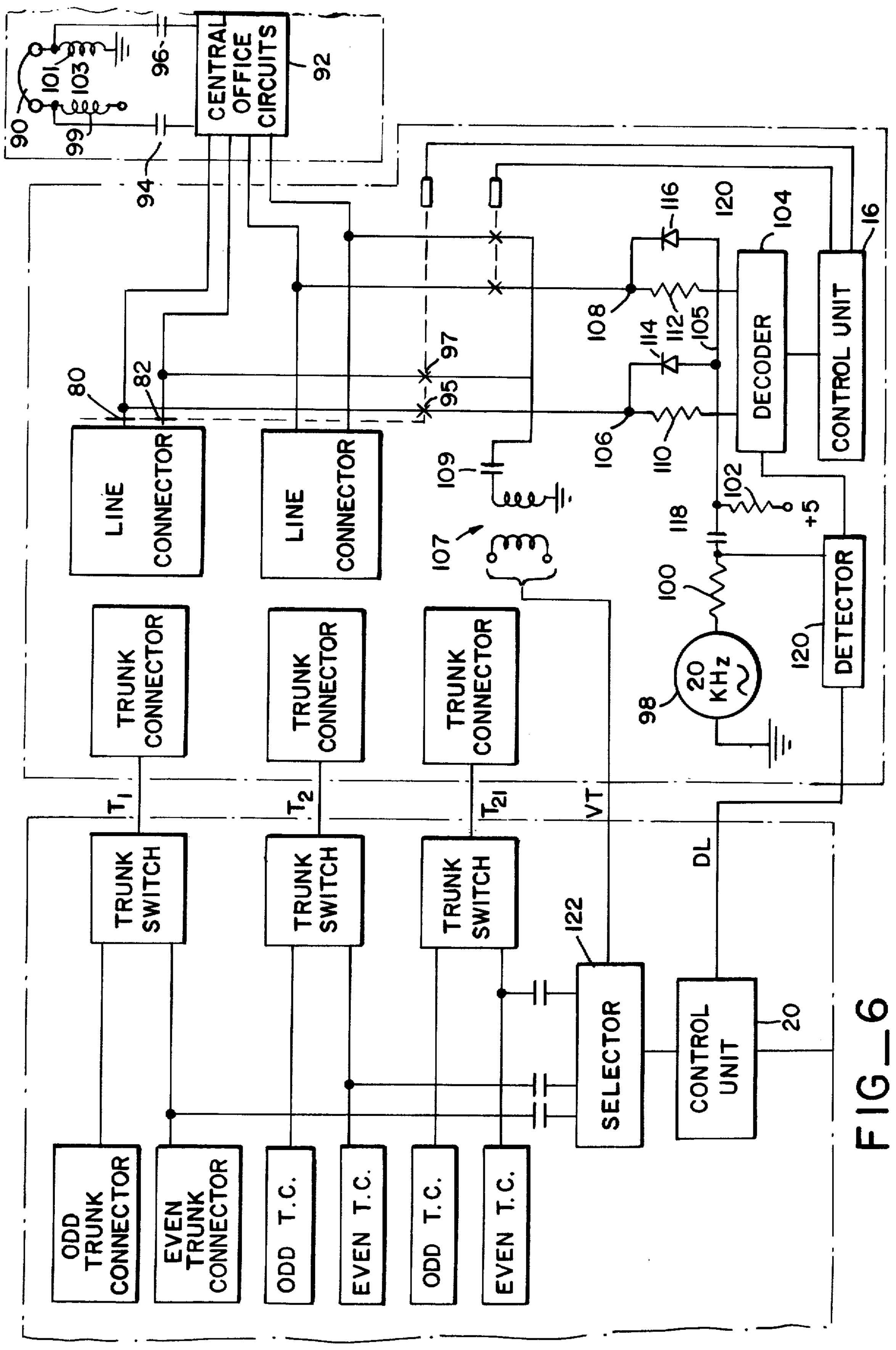
FIG. 6 is a circuit diagram, partly in block form, showing the verification circuitry of this invention.

Inasmuch as an intracall connection which releases both trunks severs the voice path between the subscriber and the central office, verification (i.e., monitoring to check whether a line is really in use) of an intracall in equipment of this type is not possible. The present invention solves this problem in the manner shown in FIG. 6.

In that figure, the verification operator at the central office 12 can connect her headset 90 across any of the lines $L_1$ through $L_{112}$ through the central office switchgear 92. Assuming that she desires to verify line $L_1$, which is talking on an intracall, she actuates the central office switchgear to connect her headset 90 through capacitors 94, 96 across the tip and ring leads of line $L_1$.

When the intracall was established, the central office control unit 16 had operated relay 88 (see description of FIG. 5). The opening of contacts 80, 82 broke the DC tip-ring circuit, while the AC verification circuit of FIG. 6 to the central office 12 was established through contacts 95, 97. Normally, the AC circuit to the central office 12 is also open, as there is no connection between the tip and ring leads after the central office switch train has dropped out. When the verification operator comes on the line, however, she establishes an AC connection between the tip lead, ring lead, and ground at the central office 12 through capacitors 94, 96 and windings 99, 101 of bifilar talking battery relay 103.

A 20 kHz oscillator 98 is permanently connected to line 105, which is maintained at a positive 5-volt potential by resistor 102, through resistor 100 and capacitor 118. The scanner 104 scans the lines by selectively grounding, one by one, junctions 106–108 through resistors 110–112.

Grounding of junction 106 forward-biases the normally reverse-biased diode 114, and the 20 kHz signal is injected into the tip lead of $L_1$. This signal is transmitted through capacitor 94, and through a parallel path consisting of winding 99 and the talking battery $V^-$ on the one hand, and the headset 90 and relay winding 101 on the other hand, to ground. The relay windings 99, 101 constitute a low-impedance path for the 20 kHz signal because the magnetic fields created by the passage of the signal through the windings cancel each other due to the windings being bifilarly wound.

The low-impedance grounding of the 20 kHz signal circuit results in a signal voltage drop between resistor 100 and capacitor 118, which is sensed by detector 120 and is conveyed to the scanner 104 to stop the scan and to actuate the control unit 16 to cause control unit 20 to operate selector 122 in such a manner as to connect the verification trunk VT to the even trunk connector connected to the subscriber line being verified.

The conversation now appearing on verification trunk VT is injected into the ring lead of line $L_1$ through transformer 107 and capacitor 109. The ring lead, like the tip lead, is AC-grounded through capacitor 96 and the parallel path involving the windings of relay 103 and the verification operator's headset 90, whereby the remotely connected conversation can now be verified.

As soon as the verification operator goes off the line, the signal potential sensed by detector 120 rises, and the control units 16, 20 disconnect selector 122.

6. Reorder Signal Injection

The ringing signal on a terminating call is applied to the line by the central office 12. It appears when the central office switch train has established the connection to the called line, e.g., $L_1$, and persists until the called subscriber goes off hook and establishes a low-resistance connection between the tip and ring leads of line $L_1$. This low-resistance connection also triggers the toll equipment which computes the charge on the call.

If the concentrator for any reason is unable to complete the connection, there is nothing to cut off the ringing signal, and the calling subscriber gets a false DA (doesn't answer) indication.

Figure 7:
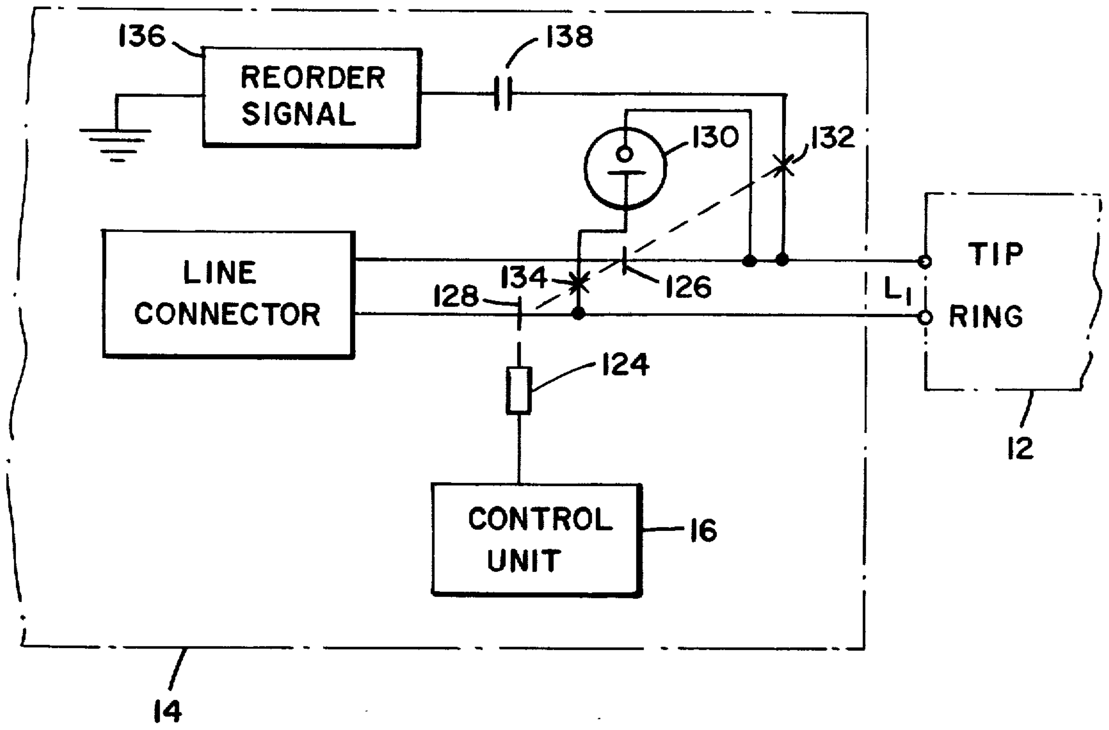
FIG. 7 is a fragmentary circuit diagram showing the reorder signal injection feature of the invention.

To solve this problem, the control unit 16 is arranged to actuate block relay 124 (FIG. 7) whenever it finds itself unable to execute a connection request on line $L_1$. Actuation of block relay 124 connects neon bulb 130 across tip and ring leads through contact 132. At the same time, reorder signal source 136 is connected to the ring lead through capacitor 138 and contact 134.

The next ringing current pulse on line $L_1$ fires the neon bulb 130 and releases the ringing circuitry. The 48-volt talking battery voltage which then remains on line $L_1$ is insufficient to keep the neon bulb 130 fired, and the bulb 130 goes out, preventing the toll equipment from being triggered. Only the reorder signal remains on the line to advise the calling subscriber that the call has been blocked.

7. Traffic Recording

The operational efficiency of the concentrator of this invention depends to some degree on an even distribution of the subscriber traffic among the various line connector groups of the concentrator. It is quite conceivable that many high-traffic subscribers may accidentally get connected to the same line connector group and cause a serious reduction in system capacity which only a complex, time-consuming traffic study can detect.

Figure 8:
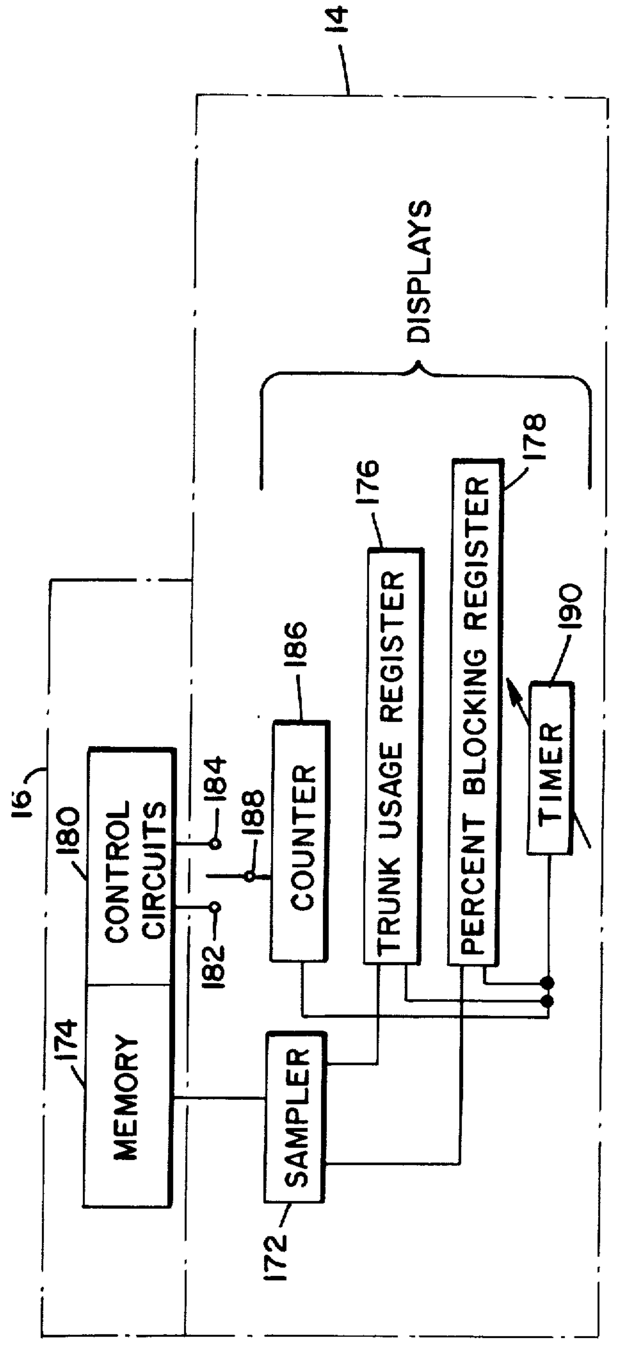
FIG. 8 is a block diagram illustrating the traffic recording feature of the invention.

To overcome this problem, the concentrator of this invention may be equipped with the traffic analyzing circuitry shown in FIG. 8. The sampler 172 is arranged to scan the memory 174 of the control unit 16 at regular intervals, e.g., every 3.6 seconds, to determine the number of trunks in use at each sampling time. This information is fed into a trunk usage register 176, which adds the sampled figures and divides the total by 1,000 to produce a numerical display which, after one hour of operation, provides a direct readout of the average number of trunks in use during that hour.

Likewise, those samplings which find no idle trunks are conveyed to a percent blocking register 178 which computes the percentage of samples during the test hour that encountered an all-trunks-blocked condition.

Finally, the control circuits 180 of control unit 16 provide an output pulse at terminal 182 whenever a subscriber service request is blocked for any reason, and an output pulse at terminal 184 whenever an intracall is connected. A resettable counter 186 can be connected to either terminal by selector switch 188, so as to display either the total number of blocked service requests or the total number of connected intracalls. If desired, an adjustable timer 190 may be provided to "freeze" the displays after the registers 176, 178 and counter 186 have run for a selected period of time.

The displays of registers 176, 178 and counter 186, taken together, immediately pinpoint trouble spots. For example, a high percentage of blocking coupled with a low trunk usage indicates probable trouble in the trunk-switching circuitry. A high number of total blocked calls coupled with a low percentage of blocking and low trunk usage points to an unbalance in the traffic distribution, while a high trunk usage figure coupled with high blocking indicates an efficiently operating but overloaded system. A count of the total number of intracalls connected permits a rapid refinement of the above diagnoses.

I claim:

1. A call concentrator for interposition between a plurality of remote subscribers and a central office having a like plurality of subscriber lines and switchgear associated therewith, comprising:

a. a central office portion including a central office switching unit and a central office control unit;
b. a remote portion including a remote switching unit and a remote control unit;
c. a plurality of trunks extending between said switching units, and a data link extending between said control units;
d. a plurality of central office subscriber lines connected to said central office switching unit, and a like plurality of remote subscriber lines connected to said remote switching unit;
e. means cooperating with said central office switchgear and a pair of said trunks for establishing an intracall in said call concentrator over said pair of said trunks;
f. means for detecting in said central office portion the establishment of an intracall between two of said remote subscriber lines which include:
   i. a source of frequency-shift-keyed signals;
   ii. a means for injecting said signals into a calling trunk when the called subscriber goes off-hook;
   iii. means for scanning the remaining trunks of the system;
   iv. means for detecting on a scanned trunk an FSK signal having the same frequencies, keying rate, and phase as the injected signal; and
   v. means for conveying to said central office control unit the identity of the trunk on which said last-named FSK signal has been detected; and
g. means responsive to the detection of an intracall for connecting said intracall directly within said remote switching units and releasing both of said pair of trunks used in establishing said intracall as well as the central office switchgear which established said intracall.

2. A call concentrator for interposition between a plurality of remote subscribers and a central office having a plurality of subscriber lines and switchgear associated therewith comprising:

a. a central office portion including a central office switching unit and a central office control unit;
b. a remote portion including a remote switching unit and a remote control unit;
c. a plurality of trunks extending between said switching units, and a data link extending between said control units;
d. a plurality of central office subscriber lines connected to said central office switching unit, and a like plurality of remote subscriber lines connected to said remote switching unit;
e. means cooperating with said central office switchgear and a pair of said trunks for establishing an intracall in said call concentrator over said pair of said trunks;
f. means for detecting in said central office portion the establishment of an intracall between two of said remote subscriber lines;
g. means responsive to the detection of an intracall for connecting said intracall directly within said remote switching unit and releasing both of said pair of trunks used in establishing said intracall as well as the central office switchgear which established said intracall; and
h. means for allowing operator verification of an intracall after said trunks and central office switchgear have been released.

3. The device of claim 2, in which said last-named means include a verification trunk extending between the central office and the remote location, means for scanning, at the central office, the subscriber lines corresponding to those subscriber lines which are connected in an intracall mode at the remote location, sensing a reduction in AC impedance on said scanned lines, and connecting said verification trunk at the remote location to the subscriber line on which an impedance reduction has been sensed at the central office.

4. A call concentrator for interposition between a plurality of remote subscribers and a central office having a like plurality of subscriber lines and switchgear associated therewith, said central office including ringing generator means for generating a ringing signal for transmission to a calling party when a terminating call is received on a subscriber line which said central office sees as being on hook, as well as toll equipment arranged to be triggered by a subscriber line going to an off hook condition upon receiving a terminating call, said call concentrator comprising:

a. a central office portion including a central office switching unit and a central office control unit;
b. a remote portion including a remote switching unit and a remote control unit;
c. a plurality of trunks extending between said switching units, and a data link extending between said control units;
d. a plurality of central office subscriber lines connected to said central office switching unit, and a like plurality of remote subscriber lines connected to said remote switching unit;
e. means cooperating with said central office switchgear and a pair of said trunks for establishing an intracall in said call concentrator over said pair of said trunks;
f. means for detecting in said central office portion the establishment of an intracall between two of said remote subscriber lines;
g. means responsive to the detection of an intracall for connecting said intracall directly within said remote switching unit and releasing both of said pair of trunks used in establishing said intracall as well as the central office switchgear which established said intracall; and
h. means for cutting off said ringing signal without triggering said toll equipment and inserting an all-trunks-busy recorder indication onto said subscriber line at said central office externally of said switchgear when the concentrator is unable to establish a connection to a subscriber on said subscriber line which said central office sees as being on hook.

5. A call concentrator for interposition between a plurality of remote subscribers and a central office having a like plurality of subscriber lines and switchgear associated therewith, said central office including ringing generator means for generating a ringing signal for transmission to a calling party when a terminating call is received on a subscriber line which said central office sees as being on hook, as well as toll equipment arranged to be triggered by a subscriber line going to an off hook condition upon receiving a terminating call, said call concentrator comprising:

a. a central office portion including a central office switching unit and a central office control unit;
b. a remote portion including a remote switching unit and a remote control unit;
c. a plurality of trunks extending between said switching units, and a data link extending between said control units;
d. a plurality of central office subscriber lines connected to said central office switching unit, and a like plurality of remote subscriber lines connected to said remote switching unit;
e. means cooperating with said central office switchgear and a pair of said trunks for establishing an intracall in said call concentrator over said pair of said trunks;
f. means for detecting in said central office portion the establishment of an intracall between two of said remote subscriber lines;
g. means responsive to the detection of an intracall for connecting said intracall directly within said remote switching unit and releasing both of said pair of trunks used in establishing said intracall as well as the central office switchgear which established said intracall;
h. means for cutting off said ringing signal without triggering said toll equipment and inserting an all-trunks-busy reorder indication onto said subscriber line at said central office externally of said switchgear when the connector is unable to establish a connection to a subscriber on said subscriber line which said central office sees as being on hook; and
i. said last-named means including a gas discharge device connected across the tip and ring leads of said central office subscriber line and arranged to fire on ringing signal voltage but not on battery voltage, and means for connecting a source of reorder signals to said central office subscriber lines.

6. A call concentrator for interposition between a plurality of remote subscribers and a central office having a like plurality of subscriber lines and switchgear associated therewith comprising:

a. a central office portion including a central office switching unit and a central office control unit;
b. a remote portion including a remote switching unit and a remote control unit;
c. a plurality of trunks extending between said switching units, and a data link extending between said control units;
d. a plurality of central office subscriber lines connected to said central office switching unit, and a like plurality of remote subscriber lines connected to said remote switching unit;
e. means cooperating with said central office switchgear and a pair of said trunks for establishing an intracall in said call concentrator over said pair of said trunks;
f. means for detecting in said central office portion the establishment of an intracall between two of said remote subscriber lines; and
g. means responsive to the detection of an intracall for connecting said intracall directly within said remote switching unit and releasing both of said pair of trunks used in establishing said intracall as well as the central office switchgear which established said intracall, which means contain no intracall buses.

7. The concentrator of claim 6, in which said central office switch train is released upon establishment of an intracall by opening the tip and ring leads of both affected lines at the central office, and grounding the C-leads of both affected lines externally of said switch train for the duration of said intracall.

8. A call concentrator for interposition between a plurality of remote subscribers and a central office having a like plurality of subscriber lines and switchgear associated therewith comprising:

a. a central office portion including a central office switching unit and a central office control unit;
b. a remote portion including a remote switching unit and a remote control unit;
c. a plurality of trunks extending between said switching units, and a data link extending between said control units;
d. a plurality of central office subscriber lines connected to said central office switching unit, and a like plurality of remote subscriber lines connected to said remote switching unit;
e. means cooperating with said central office switchgear and a pair of said trunks for establishing an intracall in said call concentrator over said pair of trunks;
f. means for detecting in said central office portion the establishment of an intracall between two of said remote subscriber lines; and
g. means responsive to the detection of an intracall for connecting said intracall directly within said remote switching unit and releasing both of said pair of trunks used in establishing said intracall as well as the central office switchgear which established said intracall, which means include:
  i. trunk terminating means in said remote switching unit comprising, for each trunk, and odd and an even trunk connector;
  ii. trunk switching relay means for switching said trunk between said odd and even trunk connectors, and for connecting said even trunk connector to talking battery when said trunk is connected to said odd trunk connector; and
  iii. intracall relay means for actuating said trunk switching relay means of said pair of trunks when an intracall is detected to switch said trunks from their even connectors to their odd connectors and to establish an AC talking path between the even connectors of the said trunk.

9. The device of claim 8, in which said intracall connecting and releasing means further include:

iv. locking means associated with said intracall relay means to lock said intracall relay means in following a momentary actuation;

v. release contact means on said even trunk connectors connected to release said locking means when said even trunk connectors return to their 000 position as the intracall is disconnected; and vi. holding contact means on said odd trunk connectors connected to prevent the release of said trunk switching relay means associated therewith as long as said odd trunk connector is in a position other than 000.

10. The device of claim 8, further including remote verification means comprising:

g. a source of verification signals;

h. scanning means for sequentially applying said verification signals to those central office subscriber lines whose subscribers are engaged in a remotely connected intracall;

i. means for sensing the grounding of said verification signals through the verification operator's circuitry when a verification operator comes on the line; and j. means responsive to the sensing of said grounding for establishing an AC circuit between the even trunk connector used by the subscriber whose line is being verified and the central office line of that subscriber.

11. The device of claim 10, in which said AC circuit establishing means include a separate verification trunk.

12. A call concentrator for interposition between a plurality of remote subscribers and a central office having a like plurality of subscriber lines and switchgear associated therewith comprising:

a. a central office portion including a central office switching unit and a central office control unit;

b. a remote portion including a remote switching unit and a remote control unit;

c. a plurality of trunks extending between said switching units, and a data link between said control units;

d. a plurality of central office subscriber lines connected to said central office switching unit, and a like plurality of remote subscriber lines connected to said remote switching unit;

e. means cooperating with said central office switchgear and a pair of said trunks for establishing an intracall in said call concentrator over said pair of said trunks;

f. means for detecting in said central office portion the establishment of an intracall between two of said remote subscriber lines;

g. means responsive to the detection of an intracall for connecting said intracall directly within said remote switching unit and releasing both of said pair of trunks used in establishing said intracall as well as the central office switchgear which established said intracall;

h. sampling means for sampling the busy state of each trunk at predetermined intervals;

i. computing means for computing the average number of trunks busy, and the average incidence of all-trunks-busy blocking, during a given unit of time;

j. counter means for counting the total number of calls blocked for any reason during said unit of time; and k. display means for simultaneously displaying said averages and total.

13. The device of claim 12, further comprising switch means for selectively causing said counter means to total either the number of calls blocked or the number of intracalls connected at the remote end.

* * * * *